United States Patent
Kiss

[19]
[11] Patent Number: 6,158,760
[45] Date of Patent: Dec. 12, 2000

[54] TRAILER HITCH ASSEMBLY

[75] Inventor: Tibor Kiss, St. Joachim, Canada

[73] Assignee: Tow Hook Concepts, LLC, Grosse Pointe Woods, Mich.

[21] Appl. No.: 09/235,557

[22] Filed: Jan. 22, 1999

[51] Int. Cl.7 .................................................. B60D 1/01
[52] U.S. Cl. ..................... 280/491.5; 280/504; 280/514; 280/515
[58] Field of Search ............................... 280/491.5, 504, 280/514, 515

[56] References Cited

U.S. PATENT DOCUMENTS

| | | | |
|---|---|---|---|
| 1,479,182 | 1/1924 | Jeschke | 280/491.5 |
| 1,768,304 | 6/1930 | Ayler | 280/491.5 |
| 2,444,876 | 7/1948 | Kuhl . | |
| 2,687,899 | 8/1954 | Bendtsen . | |
| 2,712,452 | 7/1955 | Hallowell et al. . | |
| 3,311,390 | 3/1967 | Rendessy . | |
| 3,823,962 | 7/1974 | Martin, Jr. . | |
| 4,047,734 | 9/1977 | Miles | 280/486 |
| 4,202,562 | 5/1980 | Sorenson | 280/415.1 |
| 4,374,593 | 2/1983 | Smith et al. | 280/491.5 |
| 4,398,744 | 8/1983 | Schoppel et al. . | |
| 5,143,393 | 9/1992 | Meyer . | |
| 5,346,245 | 9/1994 | Budrow et al. . | |
| 5,476,279 | 12/1995 | Klemetsen | 280/415.1 |
| 5,564,357 | 10/1996 | Peterson | 114/345 |
| 5,671,938 | 9/1997 | Olson . | |
| 5,725,805 | 3/1998 | Kemnetz et al. | 252/315.2 |
| 5,839,744 | 11/1998 | Marks | 280/511 |

*Primary Examiner*—Brian L. Johnson
*Assistant Examiner*—Deanna Draper
*Attorney, Agent, or Firm*—Harness, Dickey & Pierce, P.L.C.

[57] ABSTRACT

A hitch assembly for use with a vehicle, where the hitch assembly incorporates a tow loop adapted to be easily coupled to a claw, hook or other like implement of a towing chain or alternatively to a towing strap or rope. The hitch assembly comprises a receiver and a hitch member. The hitch member includes a base portion which slides into the receiver such that only a tow loop of the hitch member is exposed. When not needed, the hitch member can be easily removed from the receiver and a different hitch implement attached to the receiver.

18 Claims, 2 Drawing Sheets

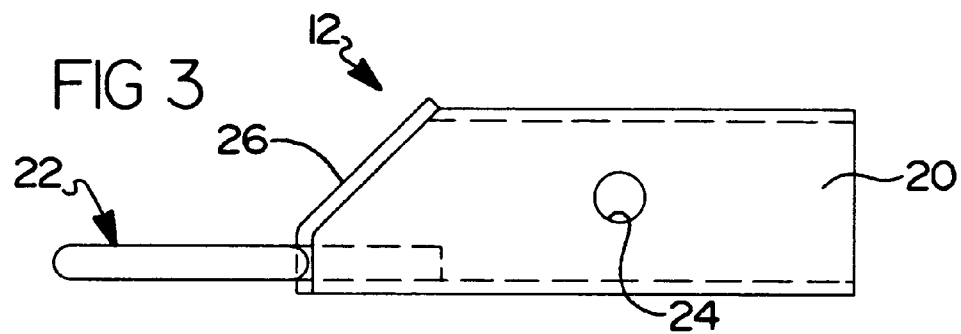
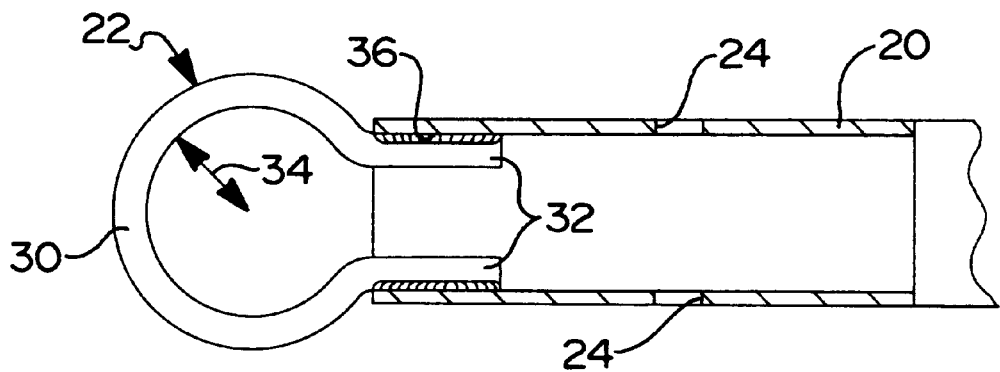
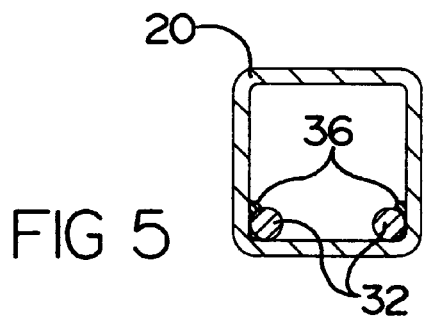

TRAILER HITCH ASSEMBLY

BACKGROUND OF THE INVENTION

1. Technical Field

This invention relates to trailer hitch assemblies, and more particularly to a trailer hitch assembly incorporating a tow loop which enables the hitch assembly to easily be coupled to a hook of a towing chain, a rope or other form of towing strap.

2. Discussion

Hitch assemblies are used in a wide variety of applications for towing trailers and other like vehicles. In one typical form, the hitch assembly includes a ball joint type hitch member which receives a mating hitch member of the item being towed. In other applications the hitch assembly includes a receiver, which essentially forms a tubular neck, into which the hitch member including such a ball joint style member is inserted. An external fastening element such as a steel pin is then inserted through openings in a portion of the hitch member as well as through aligned holes in the receiver such that the hitch member may be quickly attached and/or detached from the receiver simply by removal of one or more such pins.

The hitch implements presently available are not specifically suited for enabling towing by the use of a tow chain having a claw or hook shaped end. Furthermore, previously developed hitch members are not particularly well suited for enabling a towing strap, rope or other like item to be quickly and easily attached thereto.

In view of the foregoing limitations, it is a principal object of the present invention to provide a hitch assembly for a vehicle having a hitch member which includes a tow loop which is of dimensions to easily enable a towing chain having a hook or claw at an end thereof to be quickly and easily attached to the tow loop. It is a further object that the hitch member be constructed so as to enable it to be quickly and easily inserted into the receiver portion of the hitch assembly without modification to the receiver portion. In this matter, the hitch member can be easily removed from the receiver member and a different style of hitch member coupled to the receiver member if the tow loop is not needed.

SUMMARY OF THE INVENTION

The present invention relates to a hitch assembly which incorporates a hitch member having a tow loop portion. The hitch assembly comprises a tubular receiver which is adapted to slidably receive a base portion of the hitch member therein. Each of the tubular receiver and the base portion include openings which are formed so as to align with one another when the hitch member is fully inserted into the receiver portion. An external pin or other like fastening element can then be inserted through the aligned holes to quickly couple the hitch member to the receiver.

The tow loop of the hitch member is preferably formed from a single length of material, such as steel, in a somewhat U-shape. One end thereof forms a generally circular shape and the ends of the single length of material are positioned generally parallel to one another, and may be slid into the base portion during manufacture of the hitch member. The generally parallel end portions are welded within the base portion such that the hitch member forms an extremely strong, single piece component with the tow loop portion projecting outwardly of the base portion.

The hitch member of the present invention can therefore be quickly and easily inserted into or removed from the receiver without any special tools. The tow loop portion of the hitch member has a radius sufficiently large to enable a claw, hook or other like implement to be secured thereto. Alternatively, even a rope, nylon strap or other like implement can be inserted through the tow loop portion and used to tow another object.

BRIEF DESCRIPTION OF THE DRAWINGS

The various advantages of the present invention will become apparent to one skilled in the art by reading the following specification and subjoined claims and by referencing the following drawings in which:

FIG. 3 is a side view of the hitch member;

FIG. 4 is a cross sectional plan view of the hitch member in accordance with section line 4—4 in FIG. 2 illustrating the attachment of the tow loop portion to the base portion of the hitch member; and FIG. 5 is a cross sectional view in accordance with section line 5—5 in FIG. 2 of the ends of the tow loop portion secured within the base portion.

DETAILED DESCRIPTION OF THE PREFERRED EMBODIMENTS

Figure 1:
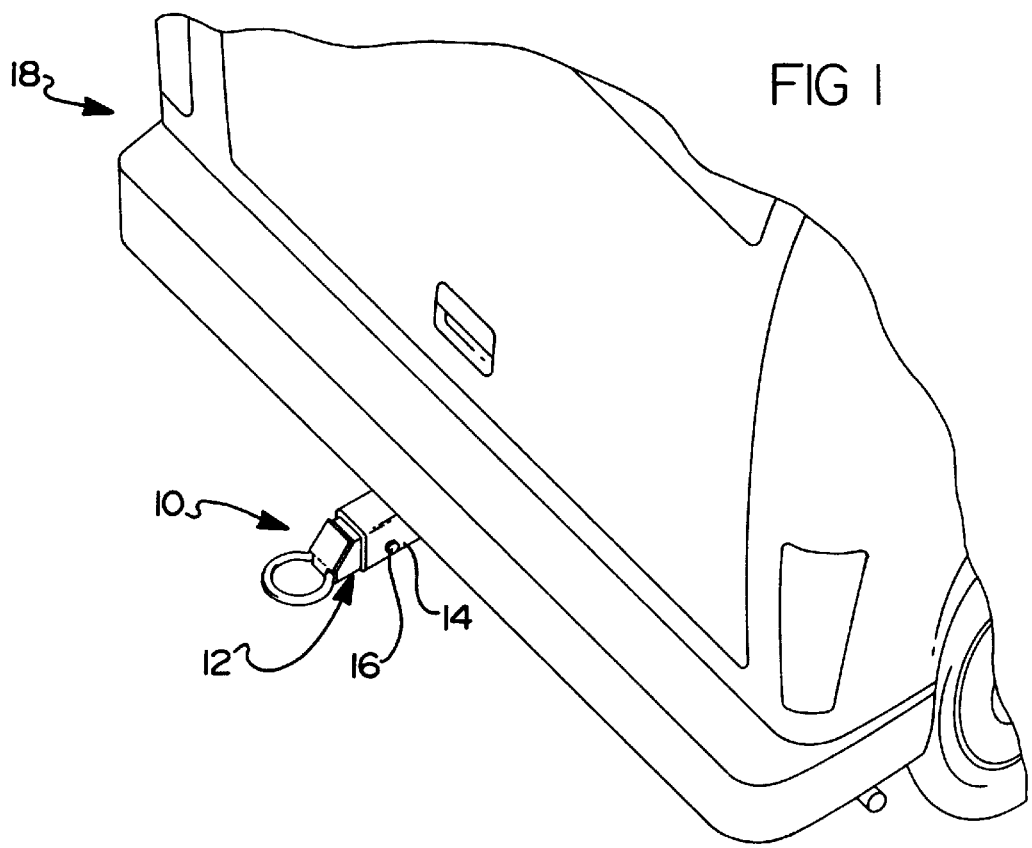
FIG. 1 is a perspective view of a portion of a vehicle illustrating a trailer hitch assembly in accordance with the present invention secured to the vehicle.

Referring to FIG. 1, there is shown a hitch assembly 10 in accordance with a preferred embodiment of the present invention. The hitch assembly comprises a hitch member 12 coupled to a receiver 14 via a locking pin or other like element 16. The receiver 14 is secured to a frame portion (not shown) of a vehicle 18 such as by welding.

Figure 2:
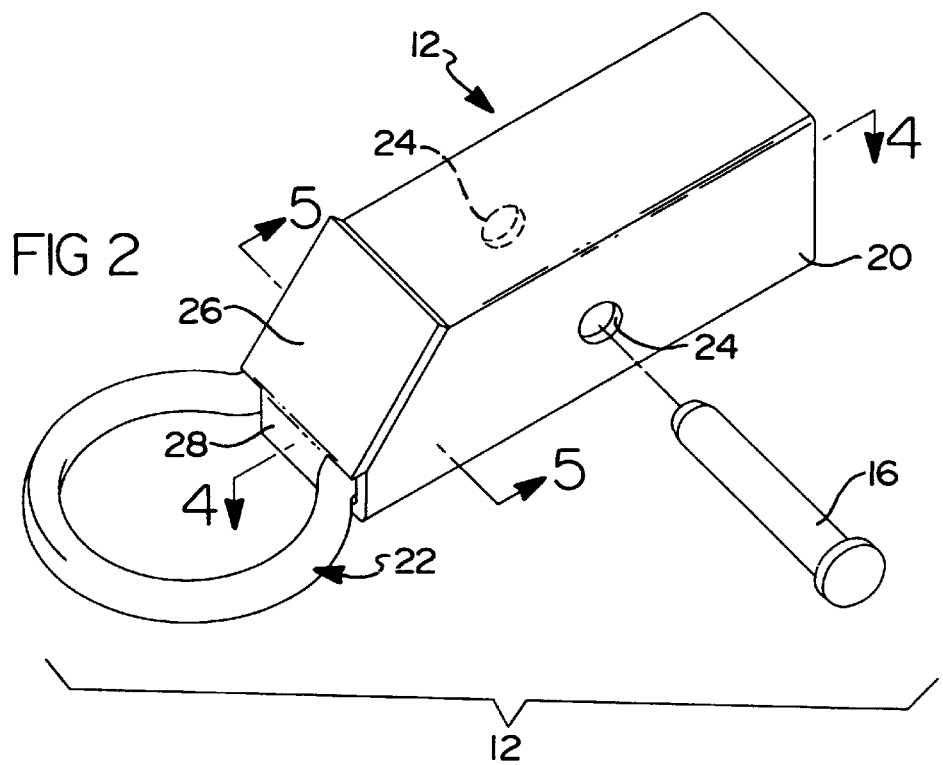
FIG. 2 is a perspective view of the hitch member of the present invention together with a locking pin used to secure the hitch member to the receiver shown in FIG. 1.

In FIG. 2 the hitch member 12 is shown in greater detail. The hitch member comprises a base portion 20 and a tow loop portion 22. The base portion 20 includes a pair of aligned holes 24 which are of sufficient diameter to receive the locking pins 16 therethrough. The base portion 20 is preferably formed form a tubular length of steel and preferably includes an end member 26 welded thereto. The end member 26 has a lip portion 28 and substantially covers one end of the base portion 20. The end member 26 not only strengthens the entire hitch member 12 to resist torsional twisting forces that the hitch member 12 might experience, but also helps to prevent rust and corrosion by sealing off the end of the hitch member 12.

Referring to FIGS. 4 and 5, the tow loop portion 22 includes a loop 30 formed in a generally semi-circular shape and having a pair of parallel disposed, terminal end portions 32. The radius of the inner circle formed by the loop 30, and designated by dimensional arrow 34, may vary widely, but in the preferred embodiment is preferably about one inch. Thus, the opening formed by the loop 30 is of sufficient size to readily accept a hook or other claw-like implement or fastening member of a tow chain, or even a strap, rope or other like implement. It will be appreciated, however, that the tow loop 30 could be formed from a tube, or could comprise a stamped or cast component. Furthermore, it need not be in a semi-circular shape; the principal requirement is that it has an opening which enables a claw or like implement to be readily attached thereto.

The terminal end portions 32 of the tow loop 22 are welded, as indicated at points 36, to interior surfaces of the base portion 20 such that the tow loop 22 is fixedly secured to the base portion 20 and forms a very strong, single piece component. As can be seen in FIG. 5, the base portion 20 is preferably square in shape and is of dimensions which enable it to be easily slidably inserted within the tubular receiver 14 (FIG. 1). It is anticipated that in most applications the receiver will form a two inch by two inch, generally square shaped tubular member. It will be appreciated, however, that these dimensions could vary considerably, and that the important consideration is that the base portion 20 can be easily inserted with a minimal amount of play into the receiver 14.

The hitch member 12 thus forms an easy means of enabling a towing implement such as a chain having a hook or claw like member, or even a strap or rope, to be easily attached to the loop 30. When the hitch member 12 is not needed, it can be easily removed from the receiver 14 and a different style of hitch implement used with the receiver 14.

The single length of material forming the tow loop may vary in dimensions, but preferably consist of a single length of steel about 0.5 inch in diameter.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A hitch assembly for use with a vehicle, said hitch assembly comprising:
    a receiver portion having a neck portion, wherein the receiver portion is adapted to be fixedly secured to a portion of said vehicle; and
    a hitch member adapted to be coupled to said neck portion, said hitch member having a hollow generally rectangular base portion for slidably engaging said neck portion, the base portion including a bottom side, a top side and a pair of lateral sides, said hitch member further having a tow loop for facilitating engagement with an external towing implement, said tow loop having a loop portion and first and second ends extending substantially into a terminal end of said base portion and fixedly secured to said base portion, said terminal end of said base portion defines an angled opening for providing vertical access to said first and second ends and said hitch member further includes a cover for said opening to said pair of lateral sides and said top side, said cover being angled from the vertical.

2. The hitch assembly of claim 1, wherein:
    said neck portion includes at least one opening for receiving an external pin; and
    said base portion of said hitch member includes at least one opening formed therein; and
    wherein said opening in said neck portion aligns with said opening in said base portion when said base portion of said hitch member is fully inserted within said neck portion, thereby enabling said external pin to be inserted through both of said openings and used to secure said hitch member to said neck portion.

3. The hitch assembly of claim 1, wherein said tow loop comprises a generally circular loop having an inner radius of about 1.0 inch.

4. The hitch assembly of claim 1, wherein:
    said tow loop is formed from an elongated length of steel formed with a loop at one end thereof and a pair of terminal ends disposed parallel to one another; and
    wherein said hitch member comprises a tubular base portion within which said terminal ends are inserted and welded.

5. The hitch assembly of claim 4, further comprising an end member welded to said neck portion to substantially cover an exposed end of said neck portion.

6. The hitch assembly of claim 1, wherein the pair of lateral sides each include a lower edge which is vertically oriented and an upper edge which angles rearwardly as it extends upwardly from the lower edge to the top side.

7. The hitch assembly of claim 6, wherein the first and second ends each have a height and the lower edges have a length, the height being less than the length.

8. The hitch assembly of claim 6, wherein the upper edge includes a horizontal dimension substantially equal to a length of the first and second ends which extends into the base portion.

9. A hitch assembly for use with a vehicle, said hitch assembly comprising:
    a tubular receiver including at least one opening formed therein, wherein the tubular receiver is adapted to be fixedly secured to a frame portion of said vehicle; and
    a hitch member adapted to be coupled to said tubular receiver, said hitch member having a base portion and a tow loop extending from a first end thereof, said hitch member further includes a cover for said opening, said cover being angled from the vertical, a second end of said base portion having at least one opening which aligns with said opening in said tubular receiver portion when said base portion is slidably inserted into said tubular receiver, thereby enabling an external pin to be inserted through both of said openings to secure said hitch member to said tubular receiver.

10. The hitch assembly of claim 9, wherein:
    said tow loop is formed by a single length of steel having a loop portion at one end and a pair of end portions of said single length of steel extending closely parallel to one another at an end thereof opposite to said loop portion; and
    wherein said pair of end portions are inserted within said base portion and welded thereto.

11. The hitch assembly of claim 9, wherein:
    said loop portion forms a generally circular loop having an inner radius of about 1.0 inch.

12. The hitch assembly of claim 9, wherein said tow loop portion and first and second ends extending substantially into a terminal end of said base portion and fixedly secured to said base portion.

13. The hitch assembly of claim 9, wherein the base portion includes a pair of lateral sides and a top side, each lateral side having a lower portion which is vertically oriented and an upper edge which angles rearwardly as it extends upwardly from the lower edge to the top side.

14. The hitch assembly of claim 13, wherein the first and second ends each have a height and the lower edges have a length, the height less than the length.

15. The hitch assembly of claim 13, wherein the upper edge includes a horizontal dimension substantially equal to a length of the first and second ends which extends into the base portion.

16. A hitch assembly for use with a vehicle, said hitch assembly comprising:
    a tubular receiver including at least one opening formed therein, wherein the tubular receiver is adapted to be fixedly secured to a frame portion of said vehicle;
    said tubular receiver comprising a pair of aligned holes adapted to receive an external pin therethrough;

a hitch member adapted to be slidably inserted in said tubular receiver, said hitch member having a base portion and a tow loop extending from a first end of said base portion and fixedly secured to said base portion, said tow loop extending from a first end of said base portion and fixedly secured to said base portion, said tow loop having a loop portion and first and second ends spaced apart, said first and second ends extending substantially into a terminal end of said base portion and fixedly secured to said base portion, a second end of said base portion having a pair of openings which align with said openings in said tubular receiver when said base portion is slidably inserted into said tubular receiver, thereby enabling said external pin to be inserted through all of said openings to secure said hitch member to said tubular receiver; and said tow loop being formed by a single length of steel and having a loop with a radius of about one inch, and wherein a pair of terminal end portions of said single length of material spaced apart and disposed substantially into said base portion so as to be insertable into said tubular receiver and fixedly secured therein, wherein the base portion includes a pair of lateral sides and a top side, each lateral side having a lower edge which is vertically oriented and an upper edge which angles rearwardly as it extends upwardly from the lower edge to the top side.

17. The hitch assembly of claim 11, wherein the first and second ends each have a height and the lower edges have a length, the height being less than the length.

18. The hitch assembly of claim 11, wherein the upper edge includes a horizontal dimension substantially equal to a length of the first and second ends which extends into the base portion.

* * * * *